Dec. 9, 1969   T. C. BOWMAN   3,482,492
JOINT SEAL
Filed April 5, 1967   3 Sheets-Sheet 1
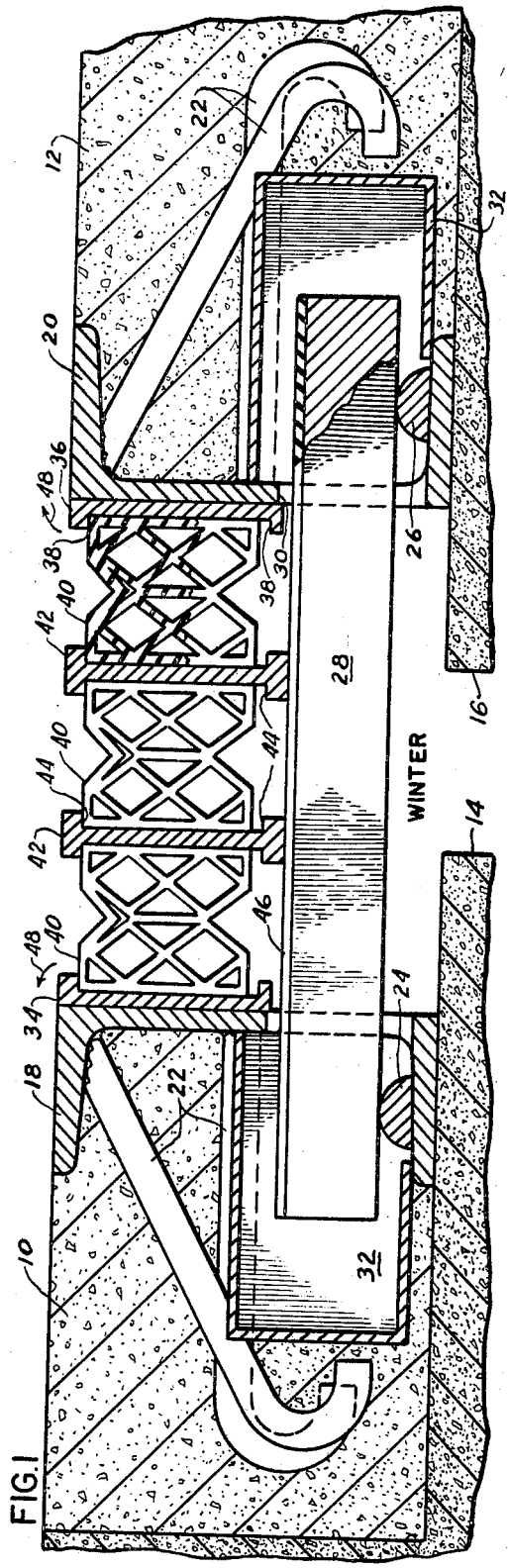
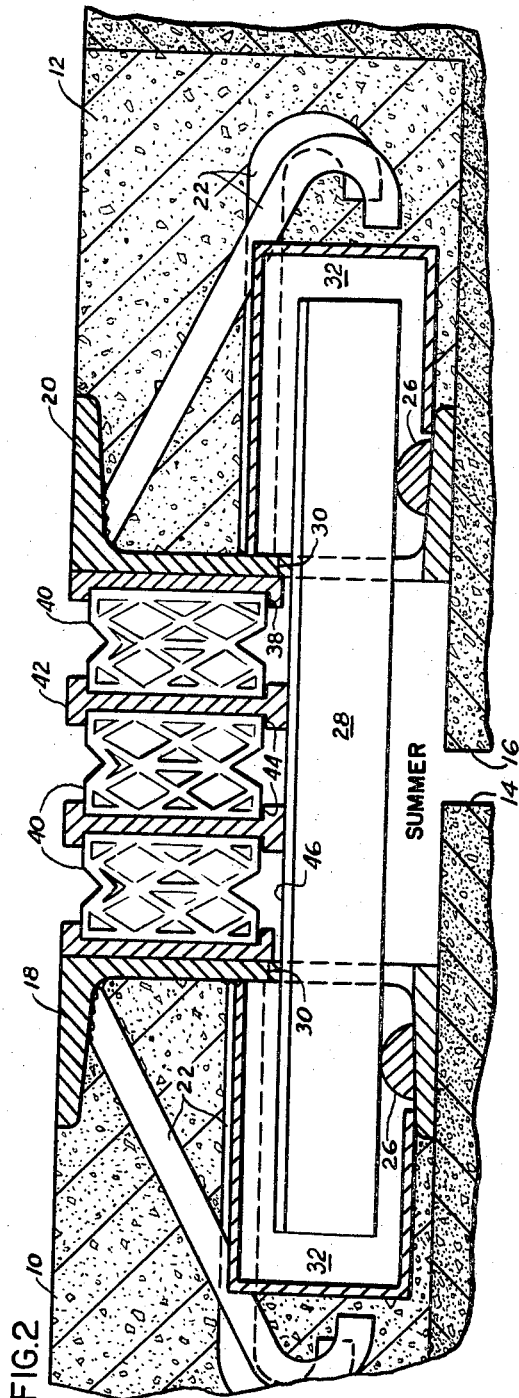
INVENTOR.
THOMAS C. BOWMAN
BY
ATTORNEYS Dec. 9, 1969

T. C. BOWMAN 3,482,492

JOINT SEAL

Filed April 5, 1967

INVENTOR.
THOMAS C. BOWMAN

BY

Dec. 9, 1969  T. C. BOWMAN  3,482,492
JOINT SEAL
Filed April 5, 1967  3 Sheets-Sheet 3
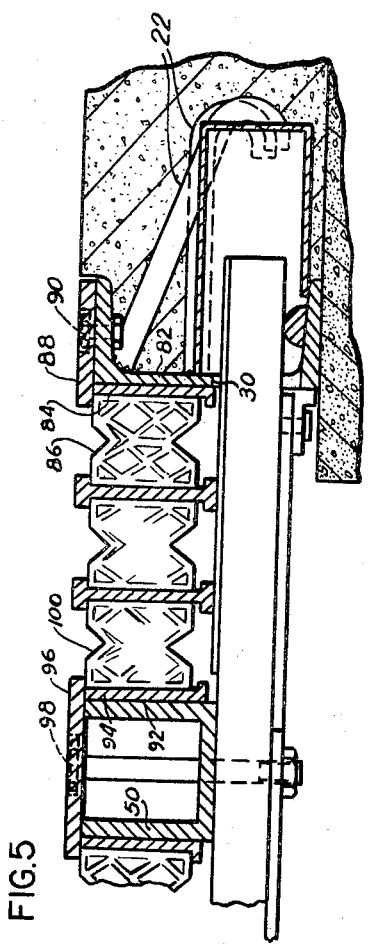
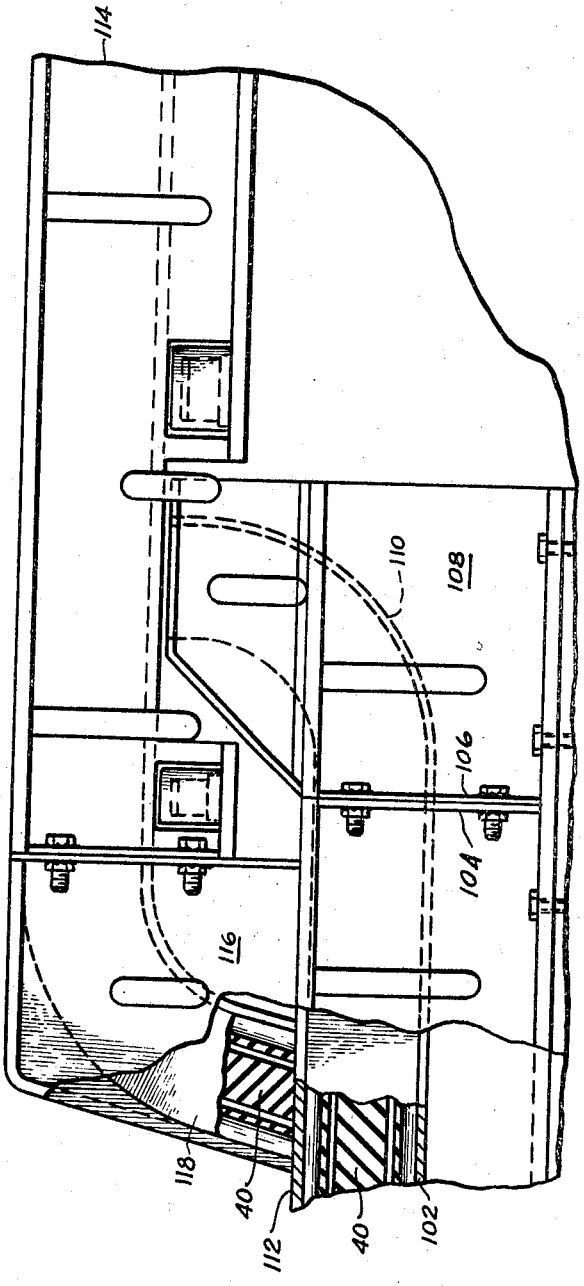
INVENTOR.
THOMAS C. BOWMAN
BY
ATTORNEYS 3,482,492
JOINT SEAL
Thomas C. Bowman, Buffalo, N.Y., assignor to Acme
Highway Products Corporation, Buffalo, N.Y.
Filed Apr. 5, 1967, Ser. No. 628,627
Int. Cl. E01c 11/10
U.S. Cl. 94—18                                        7 Claims

ABSTRACT OF THE DISCLOSURE

The joint seal consists of a pair of spaced-apart vertical plates adapted to be attached to opposing spaced-apart edges of adjacent slabs of concrete. Each plate has an aperture in it with the ends of a support beam, which extends between the plates, slidably received through the apertures. A plurality of rectangular resilient sealing elements are arranged between the plates. Each adjacent pair of the sealing elements has a support member between the sealing elements resting slidably on the support beam, and the sides of the sealing elements are respectively supported on, or attached to, the plates and the support members.

---

This invention relates to joint seals and, more particularly, relates to an improved expansion joint for bridge structures and the like requiring accommodation for large movements.

In recent years, bridge design has tended to long span construction in which concrete sections ranging from 100 to 500 feet in length are laid as the bridge deck. With temperature change, the expansion and contraction of such long spans creates a movement at the unanchored edge thereof which far exceeds the capability of expansion joint construction and seals known to the art, as, for example, those expansion joint seals set forth in U.S. Patents 3,179,026 and 3,276,336 assigned to the same assignee as the present application.

One proposed solution for this problem is set forth in U.S. Patent 3,245,328 in which the joint is formed of a plurality of plates extending the length of the joint with packings inserted between adjacent plates for sealing of the joint. An alternative construction set forth in this application is to insert between adjacent plates tubular compression seals.

Despite extensive effort in this area, packings in the nature of foam or other combinations of material have been found unsatisfactory in that they do not provide the desired recovery force and, thus, will leave gaps as the concrete contracts and the joint expands to its maximum width. The tubular sealing members will provide the desired return force but have the disadvantage that for practical joint construction, the separator plates and, thus, the entire joint structure must be very deep, preventing use in many bridge constructions and in all cases, making joint construction and installation unduly expensive.

It is, therefore, an object of the present invention to provide an improved expansion joint of structural size compatible with current bridge deck construction and which can be fabricated and installed in a more economical manner than those known to the prior art.

In accordance with this object there is provided, in a preferred embodiment of this invention, an expansion joint for installation in a gap between the opposed edges of adjacent concrete slabs, which consists of an edge channel anchored to each edge at the gap. Bearings are provided on the edge channel and supporting beams extend transversely across the gap received by said bearings in supporting relationship. A joint seal locking channel is permanently affixed to each of said edge channels. Between each of said joint seal channels, a plurality of I-beam support members are positioned extending the length of the gap and adapted to be supported by said supporting beam. Seals as defined in U.S. Patent 3,276,336 are inserted between each joint seal locking channel and between each I-beam support member positoned within the gap. By this arrangement, the desired return force can be obtained in a structure, the depth of which is compatible with bridge deck construction and provides the structure requiring no additional precautions against displacement of the I-beam members.

Having briefly described this invention, it will be described in greater detail along with other objects and advantages in the following portions of the specification, which may best be understood by reference to the accompanying drawings, of which:

FIG. 1 is a cross section elevation view of a joint constructed in accordance with the present invention;

FIG. 2 is a cross section view of the joint shown in FIG. 1 to illustrate operation of the joint during temperature changes;

FIG. 5 is a partially sectioned elevation view of another embodiment of the joint shown in FIG. 3; and FIG. 6 is a partially sectioned elevation view of the joint at a curb.

Figure 3:
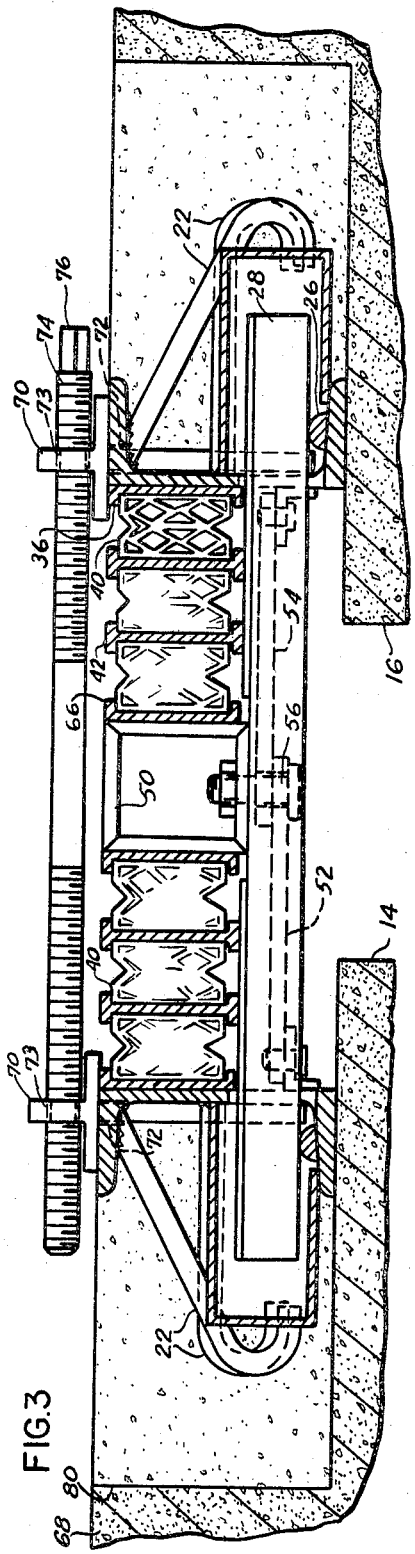
FIG. 3 is a cross section elevation view of a joint constructed in accordance with another embodiment of the present invention and which is useful in illustration of the installation of such joints.

In FIG. 1, there is shown a joint constructed in accordance with the present invention as installed between concrete slabs 10 and 12. The upper portions of the opposed edges of the slabs are formed during construction to provide a recess for installation of the joint seal assembly with the lower portions 14 and 16 of the opposed edges respectively providing the requisite strength for carrying the load on the joint. A space is provided between the opposed edge portions 14 and 16 to prevent the edges of the slabs from contacting each other during temperature changes in installation.

The opposed edges of the slabs are faced respectively with vertical plates provided by edge channels 18 and 20, which are permanently anchored to the respective slabs by anchor rods 22. Bearing blocks 24 and 26 are provided in the edge channels 18 and 20 to receive and support supporting means 28 which extend transversely across the gap and through apertures 30 in the edge channels. The beams must support the anticipated loading on the joint and, thus, must be of size and spacing suitable for the application intended. In most installations, the support beams will be spaced every three feet along the joint. The bearing blocks are preferably of rounded configuration since the spans deflect under load, causing rotation of the edge channels 18 and 20 in varying degrees along the gap and it is desirable to provide the same bearing surface without deflection of the position of the supporting beam under all conditions of span loading. To prevent the entry of material which would interfere with movement of the support beams on the bearing blocks, the support beams are encased within protective containers 32 built up from plates. The containers must provide sufficient free space to accommodate the beams during movement of the concrete spans. Affixed to the edge channels 18 and 20 respectively are joint seal locking channels 34 and 36 respectively. These channels are provided with locating shoulders 38 at the top and bottom thereof to receive, position, and lock in place generally rectangular, resilient expansion-joint seals 40, which are completely described in U.S. Patent 3,276,336, assigned to the same assignee as the present application and the teachings of which is incorporated herein by reference. I-beam members 42 are positioned within the gap extending longitudinally of the gap. The I-beam members are similarly provided with locating shoulders 44 on top and bottom to receive and position the sealing members. The I-beam members are dimensioned to rest upon the support beam 28 with the top surface thereof at the roadway level. Seals 40 are positioned between each I-beam member. To eliminate noise as vehicles traverse the roadway, the support beam is preferably provided with a rubber pad 46 at the upper surface thereof.

The relative displacement of the various members can best be shown by comparison of FIGURES 1 and 2. FIGURE 1 shows the joint during winter temperatures when the gap is the widest. FIGURE 2 shows the gap during summer temperatures when the gap is narrowest. During movement of this concrete from the positions shown respectively in FIGS. 1 and 2, a support beam slides across the bearing 24 and 26 and the I-beam members 42 slide along the pad 46 on the surface of the support beam. The seals 40 must be capable of withstanding compression forces without permanent set and must return to the expanded state while still providing sufficient force upon the abutting structure to prevent the entry of moisture, sand, road chemicals and the like into the joint. With the joint seals 40 shown having parallel sides and locating shoulders at top and bottom thereof, the I-beam members 42 are maintained within the joint by the structural strength of the seals and the locking channels 34 and 36. The joint movement in a typical joint construction as shown in FIGS. 1 and 2 will be a total movement of the order of 5 inches. Each seal will be a 3½-in. wide seal installed under a maximum of 15% compression at maximum joint width.

The joint construction shown in FIGS. 1 and 2 hold the I-beam members 42 properly under the severe conditions of loading of the span. As the span is loaded, the edges of the slabs 10 and 12 rotate in the directions indicated by arrows 48. However, the support beam does not deflect and the elastomer seals 40 take up the rotation while still providing the proper holding force for the I-beam members.

As will be noted, the structure of the joint of FIGS. 1 and 2 is of minimal depth, usually requiring no more than an 8-in. depth of the prepared recess. Since the edge portions 14 and 16 of the slab must carry the joint loading, the total slab can be 14-in. in thickness which is compatible with bridge deck construction. In the other joint arrangements proposed by the art, the joint depth was 16-in. requiring a total bridge deck slab of 24-in. or more which is incompatible with present construction. The drastic reduction of depth of applicant's joint can be attributed to the specific construction using the seal shown which, in many applications, would be a seal which is 3½-in. wide by 3½-in. in height in the uncompressed state. At any rate, the height of the individual seal element 40 should be no more than 1½ times the width thereof and is preferably closer to a 1:1 height to width ratio. In addition to the advantage that the joint is of drastically reduced depth, the joint construction shown requires fewer cross channels 42 than in the construction of the prior art.

Figure 4:
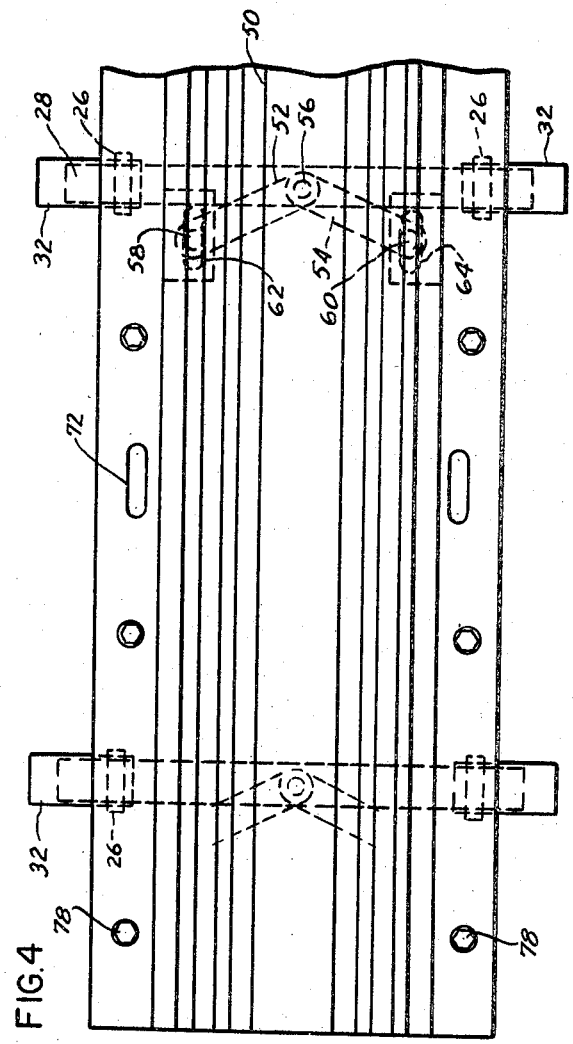
FIG. 4 is a top plan view of the joint shown in FIG. 3.

For expansion joints requiring greater movement as, for example, joints requiring movements of 10 inches, the embodiment shown in FIGS. 3 and 4 may advantageously be employed.

In FIGS. 3 and 4, there is shown a joint construction in which like parts have been similarly numbered. The seal comprises the edge channels 18 and 20 and spaced apart support beams 28 which may, for example, consist of 2 x 2" steel bars carried on a half round bearing 26. Secured to the midpoint of the support beam 28 is a box spacer member 50. The spacer 50 is secured so that it is maintained in the midpoint of the joint by links 52 and 54 pivotably coupled by pin 56 to the spacer. The free ends of the links are provided with pins 58, 60 respectively which slide in slots 62, 64. The tendency of this linkage when coupled with the force exerted on the spacer by the joint seals 40 maintains the spacer 50 at the midpoint of the seal. It might here be noted that the force on the spacer exerted by the seals is approximately 200 lbs. per foot. On each side of the spacer 50, joint seals 40 are provided between the locking channels 36 affixed to the edge channels 18 and 20 and the channel member 66 affixed to the face of the spacer. The sealing elements 40 and the transverse I-beam members 42 are identical to those shown in FIGS. 1 and 2 and the description will not be repeated.

FIGS. 3 and 4 are also useful in illustrating the simplicity of installation. A gap is provided between adjacent slabs 68, with a recess 80 in the opposed edges of the slabs. Compression fittings 70 are inserted into apertures 72 provided in each of the edge channels 18 and 20. Each compression fitting 70 is provided with a threaded bore 73 to receive the thread 74 on a turnbuckle 76. As the turnbuckle is rotated, the fittings will be drawn together to compress the joint to its operative distance for the temperature existing at the time of installation. The compressed joint assembly is then positioned and bolted by bolts 78 through the lower flange of the edge channel. The recess 80 is then filled with concrete and allowed to set. The fittings 70 are then removed. They may be greased to facilitate removal from the set concrete. The apertures 72 are then filled with grout or welded over to completely seal the joint structure.

Experience has shown that the seals are capable of operation over extended periods of time. For removal and replacement, the I-beam members may be spread apart to free a seal member. However, in some installations where bridge slippage is considered a possibility, the embodiment shown in FIG. 5 may advantageously be employed.

In FIG. 5, there is shown the edge channel 82 having an L-shaped fitting 84 affixed thereto. To provide an upper shoulder for locking the seal 86 in place, a plate 88 is removably secured to the top flange of channel 82 by bolt 90. Similarly, the spacer 50 is formed as a U-shaped channel 92 having an L-shaped fitting 94 affixed thereto. A plate 96 is removably secured to the channel 92 by bolt 98 simultaneously to close the channel and to provide an upper shoulder for holding seal 100. With this type of structure, plates 90 and 96 may be removed and the entire seal and I-beam member arrangement between can be easily removed. This construction is somewhat more expensive but allows freedom for removal of complete sections or insertion of sections with bridge slippage.

When sealing joints for bridges, provision must be made for maintaining the seal at the curb of walkways. This can be done as is shown in FIG. 6.

In FIG. 6, there is shown a joint seal assembly 102. At the end of the joint seal, a flange 104 is provided to which is bolted and welded a flange 106 to attach the end seal unit 108 thereto. The end seal unit carries upwardly turned I-beam sections 110 which are welded to the ends of the respective I-beam members of the joint. The seals 40 are continued across the joint and into the upwardly curved I-beam section 110. This carries the seals 40 above the gutter line 112 to prevent water from entering into the joint by spilling over the end of the joint. The walkway is provided by a joint seal assembly 114 which is identical in construction with the roadway surface seal assembly but, due to the light loads, can be of lighter construction and is provided with an end section 116 having downwardly curved I-beam members 118 between which are positioned seal units 40, again to protect against the ingress of water.

This invention may be variously modified and embodied within the scope of the subjoined claims.

What is claimed is:

1. A joint for sealing the gap between the edges of concrete roadway slabs which in use are separated by varying distances dependent on the temperature of each slab, which comprises an edge channel mounted on the edge of each slab, each edge channel having an aperture therein and a lower flange extending in toward the slab on which it is mounted, a support beam extending transversely of said gap with its ends extending through the apertures in the edge channels, bearing blocks mounted on the lower flanges of said edge channels supporting said ends of the beam slidably and rotatably thereon, a channel member affixed to each of said edge channels, at least one I-beam member extending the length of said gap, an elastomer seal having one wall bearing on said edge channel and the oppposite wall bearing on said I-beam member, said seal having a generally rectangular outline and having a height no greater than 1½ times its width, said I-beam member having its bottom flange slidably resting on said support beam to slide transversely of the gap and the other edge substantially at the level of the roadway surface.

2. A joint in accordance with claim 1 in which an aperture is provided in the top flange of said edge channel for receipt of a clamping fitting to clamp together said edge channels during installaton of said joint.

3. A joint in accordance with claim 1 which includes a central spacer box member positioned between said seals and said I-beams.

4. A joint in accordance with claim 1 which includes an I-beam extension which is curved upwardly from the plane of the roadway to encase the seals therein, thereby to provide a curb seal.

5. A joint for sealing the gap between the edges of concrete roadway slabs which in use are separated by varying distances dependent on the temperature of each slab, which comprises a vertical edge member mounted on the edge of each slab with a flange extending towards the slab, each edge member having an aperture therein, a support beam extending transversely of said gap with its ends extending through the apertures in the edge members, bearing blocks mounted on said flanges of the edge members supporting said ends of the beam slidably and rotatably thereon, at least one vertical plate member extending the length of said gap, a resilient seal element having one wall bearing on said edge member and the opposite wall bearing on said plate member, said seal element having a generally rectangular outline and having a height no greater than 1½ times its width, means supporting said one wall of the seal element on said plate member, and means supporting said opposite wall of the seal element on said plate member, and said plate member having its bottom edge slidably resting on said support beam to slide transversely of the gap and its top edge substantially at the level of the roadway surface.

6. The joint of claim 5 including walled sockets adjacent the apertures in the edge members extending into the edges of the slabs for receiving said ends of the support beam.

7. The joint of claim 5 which includes a rectangular spacing member between two of said seal elements having means for supporting the adjacent sides of the seal elements, and link means pivotally connected to the spacing member with end portions thereof extending outward from opposite sides of the spacing member obliquely across the space between said edge members, outward portions of the link means at opposite sides of the spacing member being slidably mounted for reciprocating sliding movement in directions approximately parallel to the edge members thereby to support the spacing member in position between the edge members as the edge members move toward and away from each other.

References Cited

UNITED STATES PATENTS

| 3,113,493 | 12/1963 | Rinker | 94—18 |
| 3,165,986 | 1/1965 | Hirst et al. | 94—18 |
| 3,245,328 | 4/1966 | Fassbinder | 94—18 |
| 3,344,720 | 10/1967 | Hallock | 52—396 XR |

FOREIGN PATENTS

| 1,239,446 | 7/1960 | France. |
| 408,089 | 9/1966 | Switzerland. |

JACOB L. NACKENOFF, Primary Examiner

U.S. Cl. X.R.

14—16